Sept. 4, 1962 L. W. BELOUNGIE 3,052,802
VARIABLE REFERENCE PULSE GENERATOR FOR A DELAY METER
Filed Jan. 26, 1959 3 Sheets-Sheet 1

*INVENTOR.*
LAWRENCE W. BELOUNGIE
BY
Porter, Chittick & Russell
ATTORNEYS

Sept. 4, 1962   L. W. BELOUNGIE   3,052,802
VARIABLE REFERENCE PULSE GENERATOR FOR A DELAY METER
Filed Jan. 26, 1959   3 Sheets-Sheet 2

INVENTOR.
LAWRENCE W. BELOUNGIE
BY
Porter, Chittick & Russell
ATTORNEYS

Sept. 4, 1962   L. W. BELOUNGIE   3,052,802
VARIABLE REFERENCE PULSE GENERATOR FOR A DELAY METER
Filed Jan. 26, 1959   3 Sheets-Sheet 3

INVENTOR.
LAWRENCE W. BELOUNGIE
BY
Porter, Chittick & Russell
ATTORNEYS

United States Patent Office 3,052,802
Patented Sept. 4, 1962

3,052,802
VARIABLE REFERENCE PULSE GENERATOR
FOR A DELAY METER
Lawrence W. Beloungie, Watertown, Mass., assignor to Acton Laboratories, Inc., Acton, Mass., a corporation of Massachusetts
Filed Jan. 26, 1959, Ser. No. 789,062
10 Claims. (Cl. 307—106)

This invention relates to electronic timing devices and more particularly to means for producing a reference time signal at a selectively variable point in a given time period.

The present invention has particular application in systems for measuring by comparison with a reference timing signal the length of time that a periodic signal is delayed in transmission; and the particular embodiment of the invention chosen for purposes of description and illustration herein is adapted for a system having a maximum range of delay measurement of 20 milliseconds and an accuracy of 0.5 millisecond. Such a system requires not only the generation of a series of timing pulses having a pulse width of 0.5 millisecond or less and a period of 20 milliseconds (50 cycle frequency) but also the generation of such pulses at a variable time within a 20 millisecond time range. The means for accomplishing this may be termed a "clock" since the pulses are used for comparison to indicate a precise time relationship—i.e., delay.

Heretofore, typical clock circuits adapted to produce a reference time signal for delay measurements have consisted of a stable frequency source such as a fork oscillator, frequency dividers for providing a reference signal, and resistance-capacitance phase shifters for shifting the time of generation of the reference signal with respect to a relative zero. Unfortunately, considerable filtering is necessary to remove the high harmonics; and after shifting, the reference signal must be converted to a square wave and differentiated to provide triggering pulses suitable for application to the delay metering circuit. The stability requirements make the use of such systems inadvisable due to the phase variation as a function of temperature, humidity, etc., in the filters as well as the reconversion circuit.

However, using a gating and selection system, the frequency divider network can be used as a precise clock, the inherent stability of which is dependent only on the oscillator frequency source and the stability of the squaring circuits associated with the source. As a result, filters, phase shift networks, and re-squaring circuits are not required and the reference time generated is basically more stable with temperature and humidity.

Accordingly, the object of this invention is to provide a new and improved reference time signal generator for use in delay measuring systems.

Another object of this invention is to provide a new and improved method of generating reference time signals.

A more particular object of this invention is to provide a new device comprising a gating and selection system for generating reference time signals for comparative time measurements.

Other objects and many of the attendant advantages of this invention will be readily appreciated as the same becomes better understood by reference to the following detailed description when considered in connection with the accompanying drawings, wherein.

Figure 1:
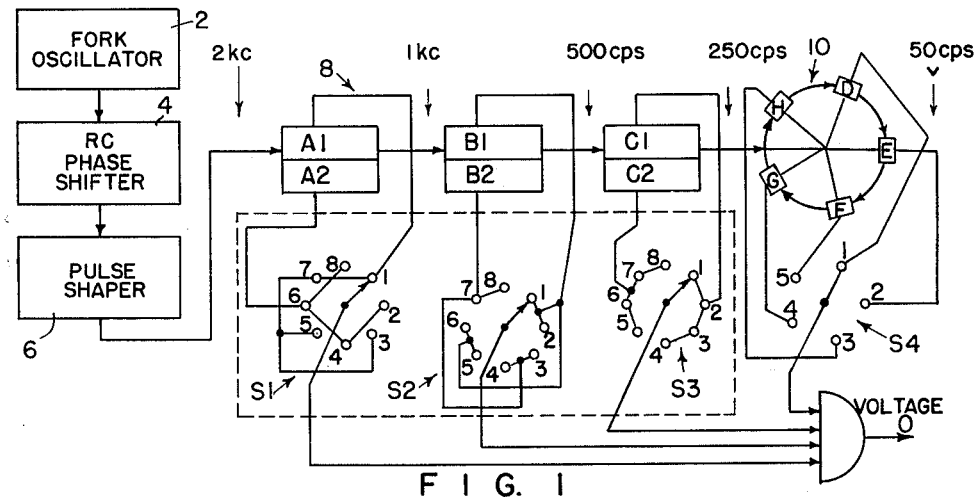
FIG. 1 is a block diagram of the new system for producing reference time signals.
Figure 5:
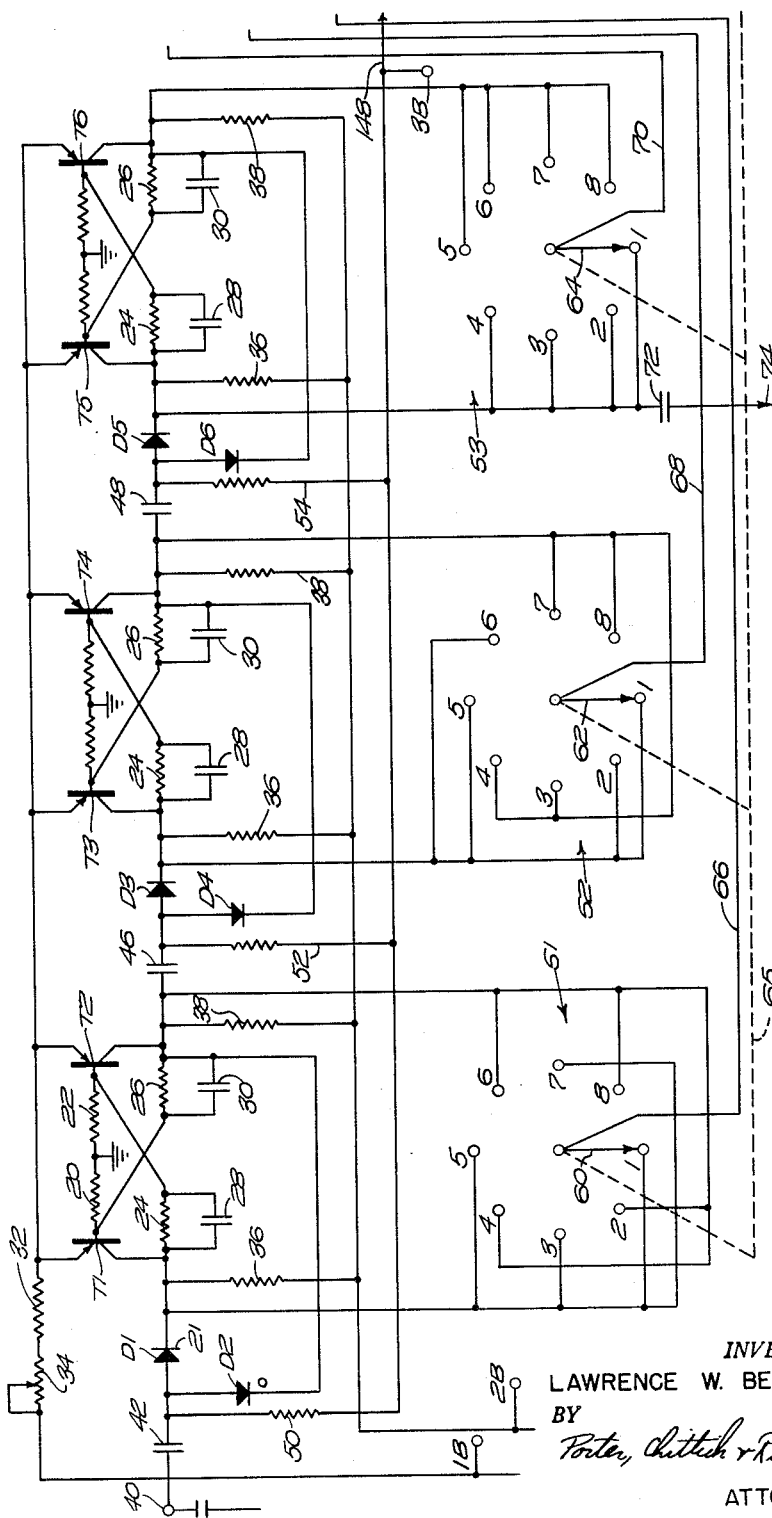
Figure 5A:
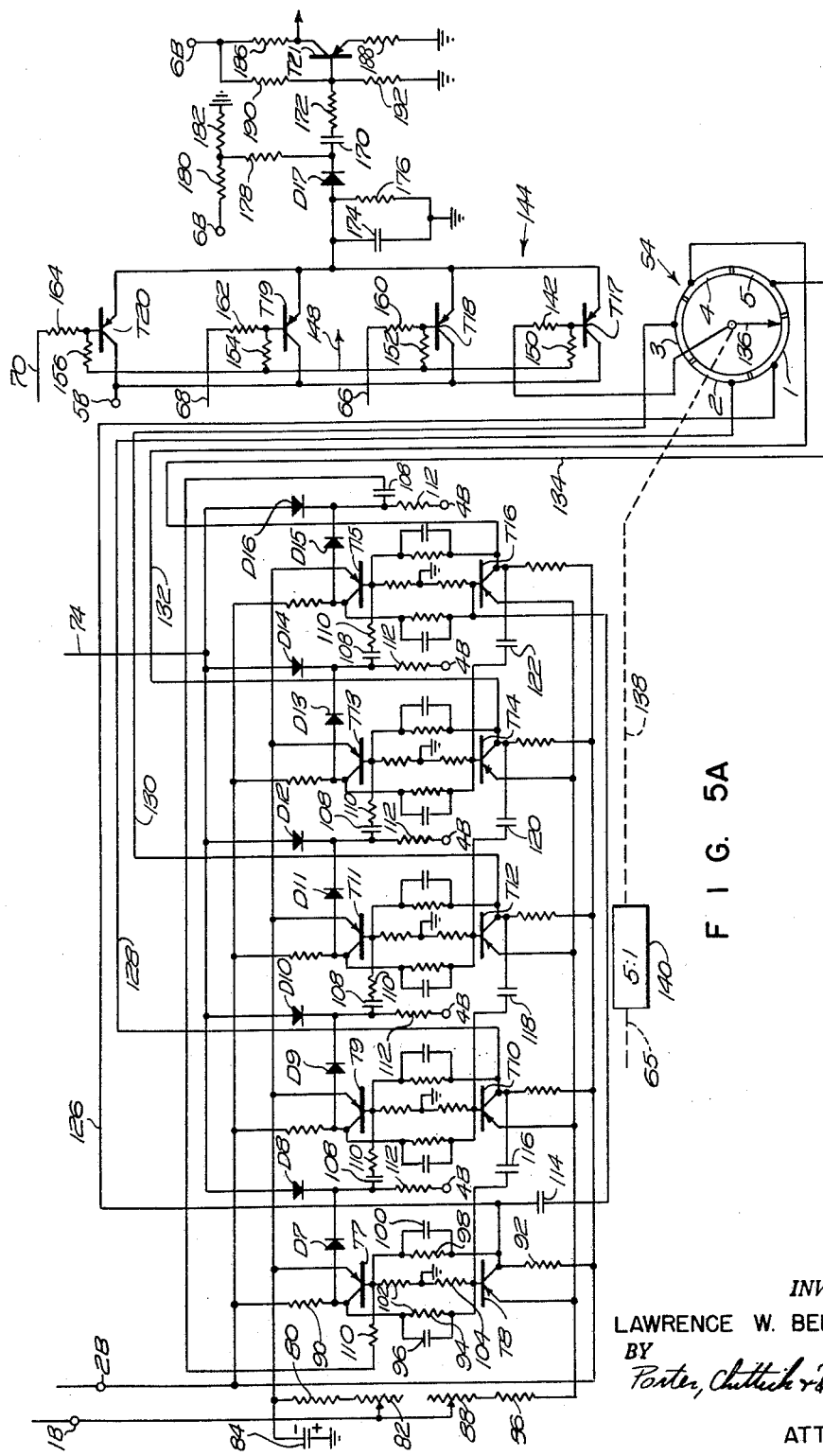

FIG. 5 and 5a together illustrate specific circuits embodied in the system of FIG. 1.

Referring now to FIG. 1, the system comprises a 2 kc. fork oscillator 2 whose output is applied first to a phase shifter 4 and then to a pulse shaper 6. It is to be noted that phase shifter 4 is not an essential part of the present invention; it is included because when the invention is embodied in a delay meter for measuring the time that the envelope of a modulated wave is delayed in transmission, a phase shift network which functions as a fine delay control by varying the phase of the 2 kc. "reference" signal is a desirable feature.

Pulse shaper 6 is essentially a clipper amplifier. Accordingly, its output is a square wave. This square wave is differentiated to form trigger pulses which are applied to a three-stage binary frequency divider chain 8. The basic elements of each stage of this chain is a bistable multivibrator, consisting of a pair of units or members. For ease of description, the units of the first stage are designated A1 and A2; the second stage units, B1 and B2; and the third stage units, C1 and C2.

In this type of multivibrator, only one unit or member of a pair is conducting at any time. The application of a triggering pulse causes the conducting unit to be cut off, while its mate assumes conduction. When the triggering pulses are precisely timed, the output voltage from the multivibrator is a square wave, the amplitude of which is the difference between the conducting and non-conducting conditions.

By using the positive-going portion of the square wave (or the negative-going as required), it is possible—after differentiation—to trigger a second multivibrator, and thence a chain. The significant point is that the trigger pulse derived by differentiation of the output of the first multivibrator still coincides with each alternate input triggering pulse. Thus, if $n$ stages are used in a chain, the repetition frequency is divided by $2^n$, and the positive-going portion of the output square wave coincides with each $2^{nth}$ trigger pulse applied to the input. Accordingly, in the embodiment illustrated in FIG. 1, units A1 and A2 have a 1 kc. output, units B1 and B2 have a 500 c.p.s. output, and units C1 and C2 have a 250 c.p.s. output.

Figure 4:
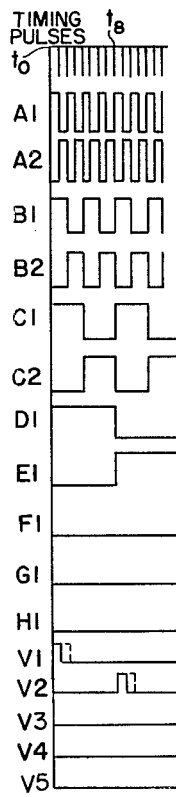
FIG. 4 shows the time relationship of signals in the system of FIG. 1.

As shown in FIG. 4, the output from one unit of each multivibrator is the reverse of its mate—i.e., when the voltage of one is low, the voltage of its mate is high. If these voltages are used for gating purposes—i.e., positive or high voltages open the gate while negative or low voltages close it—then the gate will be opened every other period. The output voltage from the mate would open the gate on the alternate periods, if used.

If the output voltages of corresponding members (e.g., units A1, B1, and C1) of a chain of multivibrators are applied to a gate adapted to produce an output voltage only when all input voltages are high, such a condition can occur only once for any given period of output voltage; and if the period of input triggering pulses is $t$ seconds, the time length of output pulse from the gate will be $t$ seconds. Moreover, if there are $n$ stages in the divider chain, the periodicity of output pulses will be $t.2^n$. Thus, if the outputs of units A1, B1, and C1 are applied to such a gate, the periodicity of the output pulses will be $t.2^3$ or $t.8$ where $t$ is the period of the input pulses applied to the stage consisting of 1a and 1b. The times of generation of the output pulses is $t_0$, $t_8$, $t_{16}$, etc.; at all times, at least one of the gating voltages will be negative, thus inhibiting the gate. The time relationship of the outputs of A1, B1, and C1 is illustrated in FIG. 4.

In order to obtain a basic period of 20 milliseconds, division of the 2 kc. signal by 40 is required. The frequency divider chain to the extent heretofore described achieves division by 8. Hence, additional division by 5 is required. This is accomplished by applying the output from unit C1 of the third stage of frequency divider 8 to a ring counter 10 having 5 stable states provided by 5 bistable multivibrators represented in block form as D, E, F, G, and H. To facilitate the description which follows, the units of these multivibrators are identified as D1, D2, E1, E2, etc.

Figure 2:
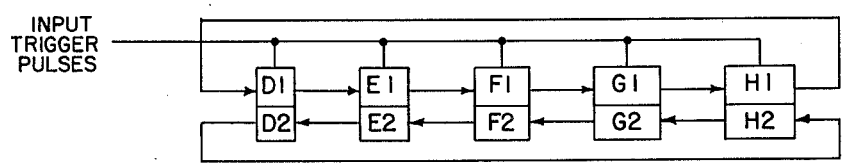
FIG. 2 is a schematic representation of a ring counter employed in the system of FIG. 1.

Referring now to FIG. 2, these five bistable multivibrators are so connected that at any given time one is high while the other four are low. The top units, or "1's," of the bistable pairs are connected such that when a triggering pulse is applied simultaneously to all five of the top units, the one which is in the conducting state will be extinguished. The act of extinguishing this member of the ring creates a pulse which triggers the member next to it. With successive triggering, the conducting state is shifted around the ring, the fifth multivibrator in order of firing (H—for purposes of illustration) triggering the first multivibrator.

Figure 3:
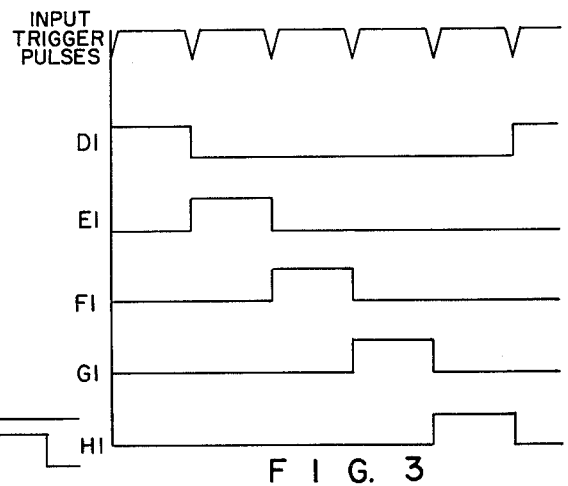
FIG. 3 shows the time relationship between input trigger pulses and the voltage of individual members of the ring counter of FIG. 2.

The time relationship between input trigger pulses and the voltage of individual members of the ring is shown in FIG. 3. As demonstrated by that figure, with successive triggering each member of the ring in turn has a period during which its output voltage is high.

If any one of the output voltages illustrated in FIG. 3 is applied to the gate circuit to which the outputs of circuits A1, B1, and C1 are also applied, there will be obtained as an output of the gate a train of pulses having a duration of $t$ seconds and a period of $5 \cdot 2^n \cdot t$. With $n$ having a value of 3 and $t$ having a value of 0.5 millisecond, the period is 20 milliseconds. However, since the high output voltages of the ring members occur in consecutive stepwise manner as shown in FIG. 3, the output pulses of the gate, when considered from a reference time $t_0$, will occur at a different time for each of said output voltages. This is because the condition under which an output is produced by the gate, that is, only when all input voltages are high, will occur at a different time for each of said output voltages. Waveforms V1, V2, V3, V4, and V5 in FIG. 4 illustrate the time relationships of the gate outputs which result when the outputs of D1, E1, F1, G1, and H1 respectively are applied to the gate with the outputs of units A1, B1, and C1.

If each of the outputs of D1, E1, F1, G1, and H1 is applied to the gate with different combinations of outputs from the three stages of frequency divider 8—e.g., with the outputs of 1a, 2b, and 3a, or with the outputs of 1b, 2a, and 3b, etc.—forty different pulse outputs will result. These forty gate outputs will have the same period and same time duration (pulse width). In the specific embodiment, the period is 20 milliseconds and the pulse width is 0.5 millisecond. However, each pulse output will differ from the reference time $t_0$ by a different integral multiple of 0.5 millisecond.

In order to variably combine the outputs of the members of ring counter 10 and the outputs of the units of the three stages of the frequency divider 8 so as to selectively achieve each of these forty different outputs, there are provided four rotary switches S1, S2, S3, and S4. Switches S1, S2, and S3 are 8-position switches and are ganged together so that their rotatable contact arms will contact corresponding contact terminals (numbered 1–8 in each case). Switch S4 is a 5-position switch which is ganged with the other three switches through a 5:1 reduction gear train (omitted from FIG. 1 for clarity).

Thus, the switch arm of switch S4 will make one revolution in the time that the switch arms of switches S1, S2, and S3 make 8 revolutions. The terminals of switches S1, S2, and S3 are connected as shown to units A1 and A2, B1 and B2, and C1 and C2 respectively, while the terminals of switch S4 are connected to the five members of ring counter 10. The arms of these switches are coupled to separate input terminals of a gate circuit 12.

These four switches permit selection of voltage pulses in progressive steps. Using time $t_0$ as a reference, when switch S2 is in position 1 and switches S1—S3 are also in position 1, a pulse at time $t_0$ will occur. With S4 still in position 1 but S1—S3 in position 2, a pulse occurs at time $t_1$. With S4 still in position 1 but S1—S3 in position 3, a pulse occurs at time $t_2$. With S4 in position 2 and S1—S3 in position 1, a pulse occurs at time $t_8$. With S4 in position 5 and S1—S3 in position 8, a pulse occurs at time $t_{39}$. Thus, considering the period of the gate output V1 in FIG. 4 as 20 milliseconds, operation of the switch permits selection of a pulse within the 20-millisecond period differing from it by any arbitrary, integral multiple of 0.5 milliseconds.

FIGS. 5 and 5a show a specific form of the invention. FIG. 5 illustrates a 3-stage transistorized binary frequency divider including an 8-position switch for each stage. FIG. 5a shows a transistorized ring counter which includes a 5-position switch and a gate circuit to which the outputs of the frequency divider chain and frequency divider ring are applied.

Referring now to FIG. 5, the 3-stage frequency divider comprises three bistable multivibrators. The first multivibrator comprises transistors T1 and T2; the second, transistors T3 and T4; and the third, transistors T5 and T6.

The multivibrators are identical in construction and basic operation. Accordingly, identical numbers are employed to designate corresponding resistors and capacitors of equal value; and except where necessary for clarity, only the construction of the first stage will be described specifically.

Referring now to the first stage, two 5.1 kilohm resistors 20 and 22 are connected in series between the bases of transistors T1 and T2. The juncture of these resistors is connected to ground. Connected between the collector of T1 and the base of T2 is a 27 kilohm resistor 24. Another 27 kilohm resistor 26 is connected between the base of T1 and the collector of T2. Capacitors 28 and 30, each of 800 micromicrofarads value, are connected across resistors 24 and 26 respectively. The emitters of T1 and T2 are connected to a positive D.C. supply 1B having a value of 10.5 volts by way of a 190 ohm resistor 32 and a 1 kilohm variable resistor 34. The collectors of T1 and T2 are connected to a negative D.C. supply 2B— having a value of —30 volts by way of 15 kilohm load resistors 36 and 38 respectively.

2 kc. input signals are applied to the frequency divider chain by means of a terminal 40. Connected in series between terminal 40 and the collector of T1 are a 620 micromicrofarad condenser 42 and a crystal diode D1. A second crystal diode D2 is connected between the juncture of capacitor 42 and diode D1 and the collector of T2. A 2500 micromicrofarad capacitor 46 and a third crystal diode D3 are connected between the collectors of T2 and T3. A fourth crystal rectifier D4 is connected at one side to the juncture of capacitor 46 and diode D3 and on the other side to the collector of T4. Another 2500 micromicrofarad capacitor 48 and a fifth crystal rectifier D5 are connected between the collectors of T4 and T5. A sixth crystal rectifier D6 is connected between the juncture of capacitor 48 and rectifier D5 and the collector of T6.

Connected between a negative D.C. supply 3B having a value of —21 volts and the juncture of capacitor 42 and diodes D1 and D2 is a 15 kilohm resistor 50. Connected in the same manner at the juncture of capacitor 46 and diodes D3 and D4 and the juncture of capacitor 48 and diodes D5 and D6 are two additional 15 kilohm resistors 52 and 54 respectively.

Connected to these three stages are three 8-position switches S1, S2, and S3, corresponding to the switches identified by the same symbols in FIG. 1.

The terminals of each switch are divided into two equal groups, one group connected to the collector of one transistor and the other group connected to the collector of the other transistor of its particular frequency divider stage. However, the groups are not identical in each stage. Instead, as in FIG. 1, the odd-numbered terminals of S1 are connected to the collector of T1 and the even-numbered terminals are connected to the collector of T2. In switch S2, terminals 1, 2, 5, and 6 are connected to the collector of T3, and terminals 3, 4, 7, and 8 are connected to the collector of T4. In switch S3, terminals 1—4 are connected to the collector of T5 and terminals 5—8 are connected to the collector of T6. The contact arms 60, 62, and 64 of switches S1, S2, and S3 respectively are mounted on a common rotatable shaft 65. The voltages picked up by arms 60, 62, and 64 are coupled to a gate circuit hereinafter described by leads 66, 68, and 70 respectively. The output appearing at the collector of T5 is applied to the ring counter of FIG. 5a by a 1000 micromicrofarad coupling capacitor 72 and a lead 74.

The square wave output voltage of pulse shaper 6 which is applied to terminal 40 must be differentiated to produce a trigger pulse having the shape and time duration necessary to trigger the first stage multivibrator or flip-flop. This differentiation is accomplished by the R-C network made up of capacitor 42 and resistor 50. In the same manner, capacitor 46 and resistor 52 differentiate the output of the first stage before it is applied to the second stage, and capacitor 48 and resistor 54 differentiate the output of the second stage before it is applied to the second stage.

Only one transistor in each multivibrator or flip-flop is conducting at a time. Since the collector of each is coupled to the base of the other by a voltage-dividing resistor, each base voltage is dependent upon the opposite collector. The voltage relationships are such that conduction in one transistor—e.g., T1—lowers the voltage of the base of the opposite transistor, T2, to beyond cut-off. When a positive pulse is applied to the collector of the non-conducting transistor (or the base of the conducting transistor), the transistor is triggered to the opposite state.

The diodes on the input side of each stage—e.g., D1 and D2—function as gates to direct the positive pulses obtained by differentiation of the positive-going zero crossings of the square wave voltage input to the collectors of the non-conducting transistors. Assuming that at a given instant T1 is non-conducing and T2 is conducting, the collector of T1 will be at approximately —20 volts whereas the collector of T2 will be at approximately 0 volts. Under these conditions, the bias on D1 will be approximately —1 volt whereas the bias on D2 will be approximately —21 volts. If then a positive trigger pulse having a value of 10–12 volts is produced by the R-C network of resistor 50 and capacitor 42 in response to the square pulse applied at terminal 40, D1 but not D2 will conduct to direct the trigger pulse to the collector of T1 and the base of T2, triggering these transistors to the opposite state. In this opposite state, D2 will be biased against conduction to a lesser degree than D1 so that when a positive trigger pulse is again produced by the R-C network, D2 will pass it to the base of T1 and the collector of T2. When this occurs, the T1 and T2 will be triggered back to their original state.

The first stage flip-flop is triggered by the positive-going zero crossings of the 2 kc. signal output of pulse shaper 6, and the second flip-flop is triggered by the 1 kc. differentiated signal output of the first flip-flop. Similarly, the third flip-flop is triggered by the 500 cycle differentiated signal output of the second flip-flop, producing a 250 cycle square wave output from the third stage. Switches S1, S2, and S3 permit selective obtainment of outputs at one or the other of the two collectors of each stage.

Referring now to FIG. 5a, the ring counter comprises five bistable multivibrators, or flip-flops, which individually have the same basic operation as the flip-flops already described. These five flip-flops comprise the following pairs of transistors: T7 and T8, T9 and T10, T11 and T12, T13 and T14, and T15 and T16. For simplicity of description and clarity of illustration, only the first flip-flop comprising T7 and T8 will be described in detail, and no numbers are employed in FIG. 5a to designate those elements of the other four flip-flops which are identical in value and location to elements forming part of the first flip-flop.

Considering now the first flip-flop, the emitter of T7 is connected by way of a dropping resistor 80 and a potentiometer 82 to the positive D.C. 10.5 volt supply 1B. Potentiometer 82 has a value of 1 kilohm. A 100 micromicrofarad capacitor 84 is connected between ground and the juncture of resistor 80 and the emitter of T7. The emitter of T8 is connected to the same D.C. supply by way of a resistor 86 and a 2 kilohm potentiometer 88. The collectors of T7 and T8 are connected to the previously mentioned negative D.C. supply 2B— through 15 kilohm resistors 90 and 92 respectively. The collector of T7 is tied to the base of T8 by means of a 27 kilohm resistor 94. A 300 micromicrofarad capacitor 96 is connected across resistor 94. The collector of T8 is tied to the base of T7 by another 27 kilohm resistor 98. A capacitor 100 equal in value to capacitor 96 is connected across resistor 98. The bases of T7 and T8 are connected by a pair of 5.1 kilohm resistors 102 and 104, the juncture of which is connected to ground.

The other identical flip-flops are connected to the two D.C. supplies 1B and 2B in the same manner as the flip-flop comprising T7 and T8, with the emitters of the odd-numbered transistors connected in one bank and the emitters of the even-numbered transistors connected in a second parallel bank. The same relationship is true of the collectors of the odd- and even-numbered transistors. The collector of T7 is connected to the base of T9 by way of a crystal diode D7, a 1500 micromicrofarad capacitor 108, and a 10 kilohm resistor 110. Connected by way of a 100 kilohm resistor 112 to the juncture of D7 and capacitor 108 is a —21 volt D.C. supply 4B. Identical diode, capacitor, and resistor elements are connected in the same manner between the collector of T9 and the base of T11, the collector of T11 and the base of T13, the collector of T13 and the base of T15, and the collector of T15 and the base of T7. Additional —21 volt D.C. supplies and additional resistors of identical value are connected to successive stages in the same manner as D.C. supply 4B and resistor 112. With the exception of the additional diodes, which are designated D9, D11, D13, and D15, these additional capacitors, resistors, and negative D.C. supplies are designated by the same numbers as their counterparts; namely, capacitor 108, resistors 110 and 112, and D.C. supply 4B.

Another crystal diode D8 is connected at one end to the juncture of D7 and capacitor 108 and at the other end to lead 74 of the circuit of FIG. 5. Additional diodes D10, D12, D14, and D16 are connected between successive stages in the same manner as D8.

In addition, the base of T16 is connected to the collector of T8 by a 470 micromicrofarad capacitor 114. Additional capacitors 116, 118, 120, and 122 having the same value as capacitor 114 are connected in the same manner between the base of T8 and the collector of T10, the base of T10 and the collector of T12, the base of T12 and the collector of T14, and the base of T14 and the collector of T16.

Outputs are taken by leads 126, 128, 130, 132, and 134 from the collectors of T8, T10, T12, T14, and T16 respectively. These leads are coupled to different contact terminals identified by numerals 1—5 of a 5-position switch S4 which corresponds to the switch of the same number in FIG. 1. In practice, the five contact terminals of switch S4 are consecutive arcuate-shaped contact segments of equal size. The adjacent ends of these contact segments are spaced from each other by slight gaps just sufficient to isolate the voltages applied thereto by leads 126—134. Switch S4 has a contact arm 136 mounted on a shaft 138 that is coupled to rotatable shaft 65 of switches S1—S3 by a 5:1 gear reduction unit 140. The voltage picked up by the rotatable contact arm 136 is applied by way of a 27 kilohm resistor 142 to the base of a transistor T17 which forms one channel of a four channel gate circuit 144. The other three channels comprise transistors T18, T19, and T20. The collectors of these four transistors are connected in a parallel bank to a negative D.C. supply 5B having a value of −10.5 volts. The emitters of all four transistors are coupled directly to each other. The −21 volt supply 3B of FIG. 5 is connected to the bases of T17, T18, T19, and T20 by a lead 148 and four parallel 330 kilohm resistors 150, 152, 154, and 156. The outputs of switches S1—S3 are applied by leads 66, 68, and 70 and resistors 160, 162, and 164 to the bases of transistors T18, T19, and T20 respectively. Resistors 160, 162, and 164 are identical in value to 27 kilohm resistor 142.

The emitters of T17—T20 are connected to the base of a transistor T21 by means of a crystal diode D17, a .5 microfarad capacitor 170, and a 47 kilohm resistor 172. Connected in parallel between ground and the juncture of the emitters of T17—T20 and diode D17 are capacitor 174 and resistor 176. The former has a value of 2500 micromicrofarads, and the latter has a value of 15 kilohms. Connected at one end to the juncture of D17 and capacitor 170 is a 100 kilohm resistor 178. The opposite end of resistor 178 is connected between a pair of resistors 180 and 182 which are connected in series between a −10 volt D.C. supply 6B and ground. Resistors 180 and 182 have values of 6.8 and 2.7 kilohms respectively.

Transistor T21 functions as an amplifier. Its collector is connected to a −30 volt D.C. supply 7B by a 47 kilohm resistor 186. Its emitter is connected to ground by a 4.7 kilohm resistor 188. Two additional resistors 190 and 192 connect its base to the D.C. supply 7B and ground. Resistor 190 has a value of 300 kilohms and resistor 192 has a value of 47 kilohms.

The emitter currents of the odd-numbered transistors T7—T15 are controlled by potentiometer 82. The emitter currents of the even-numbered transistors are controlled by potentiometer 88. These potentiometers are adjusted so that at any given instant four of the odd-numbered transistors are "on" and one is "off"; the opposite condition exists in the even-numbered transistors. The diodes D7—D16 comprise a selection system that automatically locates the only "off" transistor in the four "on" bank and directs the positve pulse applied by lead 74 to trigger "on" the adjacent "off" transistor in the same bank.

Operation of the diode selection system will now be described. Assuming that transistor T11 is "off" and the other four transistors in the same bank are "on," the voltage appearing across the resistor 112 which is connected to diode D11 will be the voltage at the collector of T11. In the illustrated embodiment of the invention, the voltage at the collectors of transistors T7—T15 will be either approximately zero (during conduction) or approximately −20 (during non-conduction). Thus, if T11 is off, the voltage appearing across resistor 112 to which D11 is connected will be approximately −20. The voltages appearing across the other four resistors 112 will be approximately zero. Accordingly, when a positive pulse is applied by lead 74 to diodes D8, D10, D12, D14, and D16, only diode D12 will conduct.

The pulse passed by diode D12 is applied to the base of T13, causing T13 to go "off" and secondarily causing T14 to go "on." The voltage resulting from the extinguishing of T13 is applied via capacitor 120 to the base of T12, causing it to go "off" and secondarily causing T11 to go "on." At this point, the initial condition of the top bank of transistors is restored—four transistors "on" and one "off"—except that now the "off" condition has moved one transistor down the bank. Successive pulses trigger the "off" condition around the ring so that it is back to its original state after every fifth pulse, thereby dividing the frequency by five. Since the output of the frequency chain which is applied to the ring counter has a frequency of 250 cycles, the outputs appearing at the collectors of T8—T16 each have a frequency of 50 cycles.

The gate circuit 144 samples the time relationships of the three outputs picked off by the switches S1—S3 associated with the binary frequency divider chain and the single output picked off by the 5-position switch S4 associated with the ring counter. The gate is activated only when all four inputs are at a relatively positive level simultaneously. The voltage appearing across resistor 176 rises to zero only when all four transistors of the gate circuit are off simultaneously. The square wave voltage output appearing across resistor 176 is applied to the base of amplifier T21, producing a series of negative pulses. It is to be noted that diode D17 functions to eliminate spurious noise and that amplifier T21 normally conducts at a low level. The output is taken between the collector of T21 and ground.

It is appreciated that the number of flip-flop units in the frequency divider chain 8 or the ring counter 10 and the number and capacity of the switches may be varied so as to provide division by an integer other than 40 and variations in delay by an amount other than 0.5 milliseconds.

One of the advantages of the present system is that it makes possible a delay or phase measuring system wherein a reference signal may be varied by precise discrete steps relative to the signal to be measured. This makes it possible to maintain small the time relationship between the reference signal and the measured signal, thus obtaining ultimate meter sensitivity. Heretofore, one could only suppress the zero of the phase or delay meter with D.C. in order to do this, but with accuracy of measurement being impaired and dependent on the stability of power supply voltages and resistor elements. Since with the present system it is possible to keep small the time difference between reference and measured signals, a more sensitive meter can be employed and smaller increments of delay may be measured.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. Apparatus comprising means for generating a high frequency pulse train, means connected to said generating means for producing in response to said pulse train a plurality of pulse outputs of identical frequencies which are out of phase with each other by fixed increments of time, said identical frequencies being a proper fraction multiple of the frequency of said pulse train, a gate circuit for producing an output signal only when a predetermined number of signals applied thereto are all at their maximum value simultaneously, means for selectively applying any one of said plurality of pulse outputs as an input to said gate circuit, and means for applying said pulse train as an input to said gate circuit.

2. Apparatus comprising first means for producing first and second pulsating voltages having identical frequencies but opposite polarity at any given time, second means for producing a plurality of pulsating voltages of identical frequencies which are out of phase with each other by predetermined increments of time, said plurality of voltages having a frequency which is a proper fraction of the frequency of said first and second voltages, a gate circuit for producing an output pulse when and only when all input signals applied thereto are at their maximum value simultaneously, means for selectively applying any one of said first and second voltages to said gate circuit, and means for selectively applying any one of said plurality of voltages to said gate circuit.

3. Apparatus as defined by claim 2 wherein said two means for applying voltages to said gate circuit are coupled together, and further including single means for operating said two coupled means to selectively apply any one of said first and second voltages and any one of said plurality of voltages to said gate circuit.

4. Apparatus comprising an oscillator for producing a high frequency pulse output, means responsive to said output for producing first and second square wave voltages both having a frequency equal to a fraction multiple of the frequency of said output with said first voltage high when said second voltage is low and vice versa, means responsive to said first voltage for producing third and fourth voltages both having a frequency equal to a proper fraction multiple of the frequency of said first voltage with said third voltage high when said fourth voltage is low and vice versa, means responsive to said third voltage for producing $n$ additional periodic voltages all having a frequency equal to $1/n$ times the frequency of said third voltage with each of said $n$ voltages high when the rest of said $n$ voltages are low, $n$ being an integral number having a value greater than one, a gate circuit adapted to produce an output voltage only when all input voltages applied thereto are high simultaneously, first switch means for selectively applying any one of said first and second voltages to said gate circuit, second switch means for selectively applying any one of said third and fourth voltages to said gate circuit, and third switch means for selectively applying any one of said $n$ voltages to said gate circuit.

5. Apparatus as defined by claim 4 wherein said first and second switch means are ganged together and further including means connecting said third switch means to said first and second switch means for operating said third switch means at a rate equal to $1/n$ times the operating rate of said first and second switch means.

6. Apparatus comprising a signal generator, means responsive to the output of said generator for producing two square wave voltages whose waveforms have an identical frequency but are mirror images of each other, means responsive to one of said two voltages for producing $n$ additional square wave voltages each having a frequency of $1/n$ times said identical frequency and each having a maximum value when the rest of said additional voltages have a minimum value, $n$ being a whole number greater than 2, a multi-input responsive gate circuit for producing an output signal only when all input signals are simultaneously at their maximum value, and means for selectively aplying as inputs to said gate circuit any one of said two square wave voltages and any one of said $n$ additional square wave voltages.

7. A clock circuit comprising means for generating a first pulse train having a first relatively high repetition rate, means connected to said generating means for producing a plurality of additional pulse trains which have identical second repetition rates equal to a proper fraction multiple of said first repetition rate and which are out of phase with each other by fixed increments of time, an "and" gate, means for applying said first pulse train as an input to said gate, and means for selectively applying any one but only one of said additional pulse trains as an input to said same gate simultaneously with said first pulse train.

8. A clock circuit as defined by claim 7 wherein said means for selectively applying said additional pulse trains to said gate comprises a rotary switch, said switch having (1) a plurality of fixed contacts to each of which is applied a different one of said additional pulse trains and (2) moveable means for selectively connecting said fixed contacts to said gate.

9. A clock as defined by claim 7 further including a ring counter having $n$ successive stages each adapted to produce one output pulse in response to $n$ successive pulses applied as an input to said counter, $n$ being an integer, means for applying one of said additional pulse trains as an input to said ring counter, and means for selectively applying the output pulses from any one but only one of said stages to said gate.

10. Apparatus comprising a signal generator, means responsive to said generator for producing two pulse trains both having a first pulse repetition rate but whose waveforms are 180° out of phase, means responsive to one of said two pulse trains for producing $n$ additional pulse trains which are out of phase with each other by predetermined increments of time but which have identical second repetition rates of $1/n$ times said first rate, $n$ being a whole number greater than 2, a multi-input responsive gate circuit, means for selectively applying any one of said two pulse trains to said gate circuit as a first input, and means for selectively applying said $n$ additional pulse trains one at a time to said gate circuit as a second input simultaneously with said first input.

References Cited in the file of this patent

UNITED STATES PATENTS

| | | |
|---|---|---|
| 2,853,634 | Diese | Sept. 23, 1958 |
| 2,858,435 | Kuhn | Oct. 28, 1958 |
| 2,860,243 | Kaplan | Nov. 11, 1958 |
| 2,863,072 | Alexander | Dec. 2, 1958 |
| 2,888,556 | Richards | May 26, 1959 |
| 2,901,607 | Stoddard | Aug. 25, 1959 |